US006900595B2

(12) United States Patent
Cojocary (10) Patent No.: US 6,900,595 B2
(45) Date of Patent: May 31, 2005

(54) ILLUMINATION UNIT FOR NORMAL AND EMERGENCY OPERATION

(75) Inventor: Mose Cojocary, Holon (IL)

(73) Assignee: Impolight, LTD (IL)

( * ) Notice: Subject to any disclaimer, the term of this patent is extended or adjusted under 35 U.S.C. 154(b) by 0 days.

(21) Appl. No.: 10/272,391

(22) Filed: Oct. 15, 2002

(65) Prior Publication Data

US 2003/0141819 A1 Jul. 31, 2003

(30) Foreign Application Priority Data

Jan. 28, 2002 (IL) .............................................. 147878

(51) Int. Cl.$^7$ ............................................ H05B 37/00
(52) U.S. Cl. ...................................................... 315/86
(58) Field of Search ........................ 315/56, 86, 209 R, 315/291, 224, 307, 87; 362/20

(56) References Cited

U.S. PATENT DOCUMENTS

| | | | | |
|---|---|---|---|---|
| 4,061,956 A | * | 12/1977 | Brown et al. ................ | 320/153 |
| 4,350,930 A | * | 9/1982 | Peil et al. ...................... | 315/49 |
| 5,426,347 A | * | 6/1995 | Nilssen .................... | 315/209 R |
| 5,473,517 A | | 12/1995 | Blackman | |
| 5,646,486 A | * | 7/1997 | Edwards et al. .............. | 315/86 |
| 6,107,744 A | * | 8/2000 | Bavaro et al. ................ | 315/86 |
| 6,479,965 B2 | * | 11/2002 | Barbeau et al. ............. | 320/115 |

* cited by examiner

Primary Examiner—Wilson Lee
Assistant Examiner—Minh Dieu A
(74) Attorney, Agent, or Firm—Leffert Jay & Polglaze, P.A.

(57) ABSTRACT

An illumination unit, that comprises a lamp; an adaptor for attaching the electrical contacts of the unit to contacts of a socket being connected to an electricity network feeding the unit through a switch, the switch electrically connects/disconnects at least one contact of the unit to/from the electricity network, while being in its conductive/nonconductive state, respectively; a rechargeable element for supplying electrical power form to the lamp during emergency period, when the electricity network fails, and an electronic circuit for automatically detecting the state of the switch and failure of the electricity network and to operate the lamp, which is operative to disconnect the unit from the rechargeable element from the electricity network, if failure is detected whenever the switch being in its conductive state, or otherwise, to disconnect the unit from the electricity network and from the rechargeable element whenever the switch being in its nonconductive state.

21 Claims, 6 Drawing Sheets

ILLUMINATION UNIT FOR NORMAL AND EMERGENCY OPERATION

FIELD OF THE INVENTION

The present invention is related to the field of lighting unit. Specifically, the present invention is related to an illumination unit that illuminates upon user demand, under ordinary conditions, using the AC power supplied by the electricity network, or in an emergency situation when the electricity network fails to provide AC power, using DC power from an internal rechargeable element.

BACKGROUND OF THE INVENTION

Several systems for providing emergency light in case of failure of the local electricity supply have been developed. For example, U.S. Pat. No. 5,426,347 discloses an arrangement consisting of a power supply for providing a high frequency current, a lamp holder including a lamp socket, and a fluorescent lamp capable of being screwed into the socket. An alternate embodiment of this Patent includes a rechargeable battery and appropriate circuitry to allow the operation of the lamp in the case of failure of the power line voltage. As another example, U.S. Pat. No. 5,473,517 discloses an emergency light that is electrically and mechanically connected to a conventional light switch. The unit contains a power-interruption detector connected to a relay that supplies DC power from self contained batteries to power a 5, 7, or 9 watt fluorescent lamp or an incandescent lamp as an emergency light source. However, none of the conventional illumination units have the capability of supplying light with the unit's lamp on demand, under normal conditions when provided with AC power supplied by the electricity network and of automatically continuing to supply light by the same lamp, if still demanded, when a power failure occurs. Nor, conversely, do they have the capability of supplying light with the unit's lamp on demand, when a power failure occurs, and of automatically continuing to supply light by the same lamp, if still demanded, under normal conditions, when provided with AC power supplied by the electricity network. Furthermore, the conventional illumination units function as an additional lighting source to other common existing light sources, and therefore they usually needs additional means for placing them on walls or ceiling.

It is therefore an object of the present invention to provide an illumination unit, having on demand illumination capability during both normal and emergency conditions.

It is another object of the present invention to provide an illumination unit which is capable of automatically detecting a demand for illumination and in response, of providing such illumination under any condition.

It is still an object of the present invention to provide an illumination unit capable of being placed in an existing light source housing.

Further purposes and advantages of this invention will appear as the description proceeds.

SUMMARY OF THE INVENTION

The present invention is directed to supplying an illumination unit that operates normally when provided with AC power supplied by the electricity network and which is also capable of automatically detecting a power failure and supplying light on demand when such a power failure occurs.

In a preferred embodiment of the invention, the illumination unit consists of a standard integral lamp, such as a compact fluorescent lamp, with the electronics section, including the rechargeable elements, such as batteries, integrally incorporated in the lower section of the device and the glass tube in the upper section. The unit has a standard base which can be screwed into a standard Edison type lamp socket.

The electronics unit is comprised of the standard elements required for normal operation of the lamp, including an electronic choke to serve as a starter and ballast during operation of the lamp; a converter section, for DC operation; a control section, comprising a microprocessor, an oscillator unit that serves as a scanner device and associated electronics to allow DC operation if it is determined that a power failure has occurred; and a rechargeable element such as battery and/or capacitor, including appropriate circuit for recharging said element.

The basic operation of the unit is as follows: With the device screwed into a standard lamp housing connected to the building electrical wiring circuit, the lamp is switched on and at the same time the microprocessor activates the potentiometer which sends out signals in the form of pulses with a frequency that increases with time over the electrical wiring circuit. If AC voltage exists then the return signals are indistinguishable from the outgoing signals. If however there is a power failure, then the signals will be changed upon encountering electrical resistance of any electrical device connected to the building wiring circuit. If it is determined that there is a power failure, then the control section signals the converter and the battery supplies high frequency DC pulses to start and maintain operation of the fluorescent lamp.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

For purposes of illustration, the invention will be described in an embodiment that comprises an integral Compact Fluorescent Lamp (CFL). Typically, CFL consumes between 5 to 60 watts approximately, and they usually have two, four, and six tube lamps, as well as circular lamps. It should be clear however to the skilled person that the illumination unit proposed by the present invention can be used with other suitable type of lamps, such as an incandescent lamp.

Figure 1:
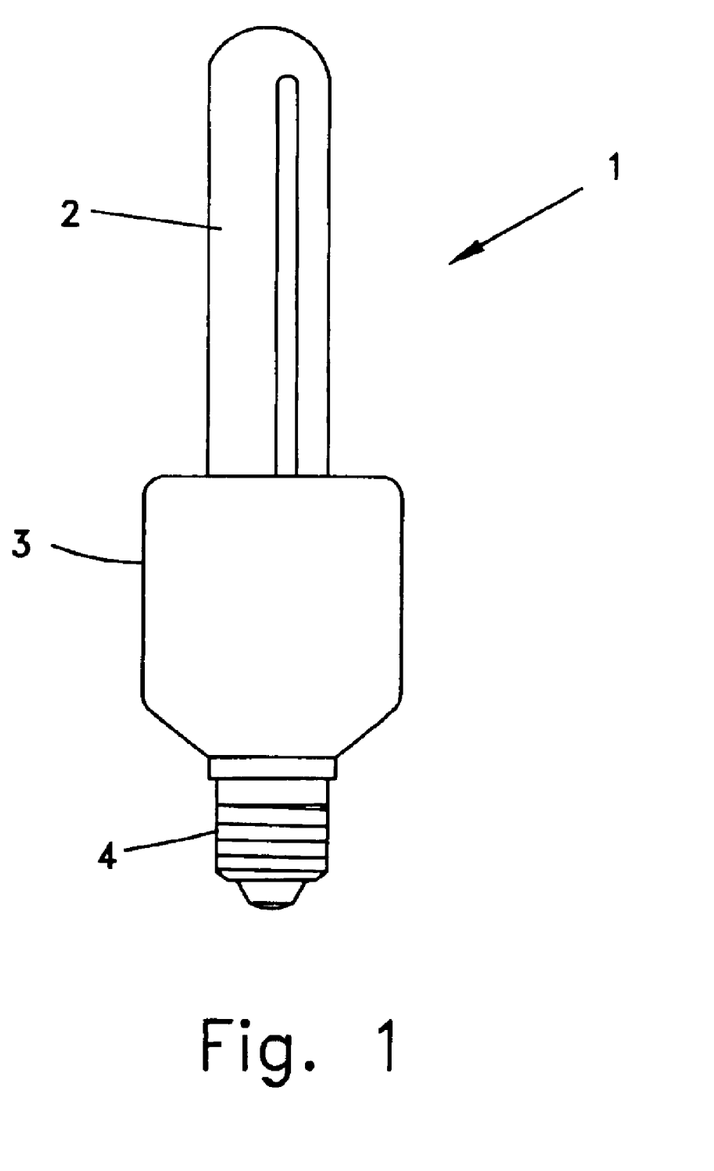
FIG. 1 is an external view of a fluorescent illumination unit, according to a preferred embodiment of the invention.

FIG. 1 is an external view of an illumination unit, according to a preferred embodiment of the invention. The illumination unit 1 consists of three parts: the lamp, which is a glass discharge tube 2, the base 3, which contains the electronic circuit for controlling the operation of the illumination unit 1, and the adaptor 4, for connecting the electrical contacts of the illumination unit 1 to contacts of a socket being connected to the electricity network.

The configuration of the illumination unit in this example of a preferred embodiment is an integral lamp, in which all the components are combined into an inseparable unit. The device may be either a modular or a dedicated device. In a modular device, the lamp is plugged into the base and can be replaced if required without discarding the whole unit. In a dedicated device, the electronic components are "hard wired" into the fixture and unlike the other two configurations, one must initially purchase a lamp fixture in order to use the illumination unit (although one can then use standard lamps).

According to a preferred embodiment of the invention, the adaptor is a screw-type made to conform to the standard Edison type sockets used in most lamp fixtures. Therefore the illumination unit disclosed by the present invention is compatible with existing fixtures in most buildings, and the illumination unit can replace existing incandescent or fluorescent lamps.

Figure 2:
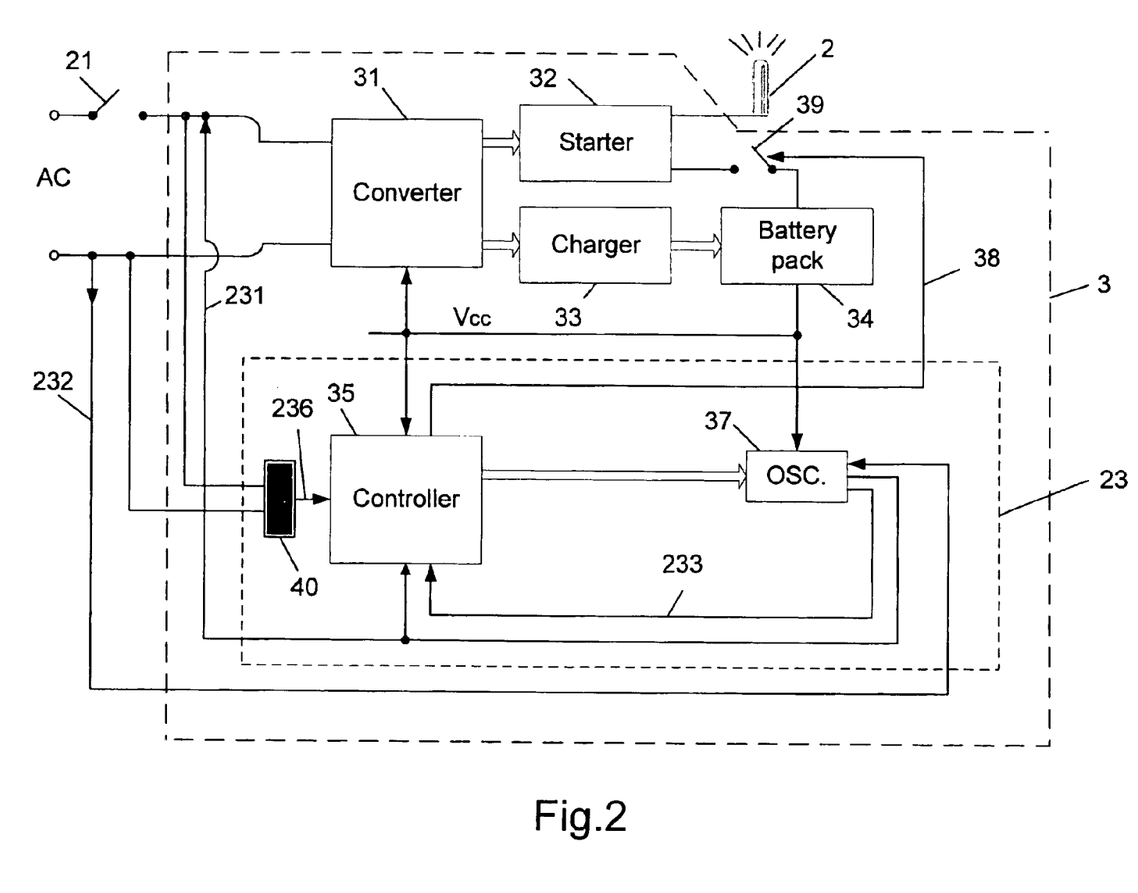
FIG. 2 is a block diagram of the electronic circuit for controlling the operation of a fluorescent illumination unit, according to a preferred embodiment of the invention.

FIG. 2 is a block diagram of the electronic circuit for controlling the operation of the illumination unit 1 of FIG. 1, according to a preferred embodiment of the invention. The Base 3 comprises a converter 31, an electronic choke 32, a charger 33, a rechargeable element 34 and a control unit 23, which comprises a controller 35, an oscillator unit 37 and a sample unit 40.

The normal operation of the illumination unit 1 (FIG. 1) refers to an operation mode during which the electricity network provides the required electrical power in AC form, and switch 21 (which is typically, but not limitatively, manually controlled by a user) is closed when it electrically connects the required contact (or contacts) of the illumination unit 1 to the electricity network (i.e., switch 21 is in its conductive state). During normal operation the electronic unit in the base 3 functions as follows:

The converter 31 converts the electrical power from AC voltage form into one or more different levels of electric power in DC voltage form, and provides the required DC voltage level to the electronic choke 32, which in turn lights up (activates) the glass discharge tube 2. According to a preferred embodiment of the invention, the converter 31 also provides the required DC voltage to the charger 33, which charges the rechargeable element 34. The rechargeable element 34 is preferably, but not limited to, a rechargeable battery, but it can also be another suitable power supply element or rechargeable element, such as a capacitor, an array of capacitors, etc. The rechargeable element 34, when charged, provides the required operation voltage to each element in the electronic unit that needs it, such as the controller 35, the oscillator unit 37 etc. During the normal operation of the illumination unit 1, the control unit 23 scans the electricity network, in order to detect if a failure occurs in supplying the required electric power in AC form. Electric power in AC form will be called hereinafter AC power.

According to a preferred embodiment of the invention, whenever there is a failure in supplying the required AC power to the illumination unit 1 (FIG. 1) and switch 21 is closed it is an emergency period, in which the electronic unit in the base 3 operates as follows:

The controller 35 causes the rechargeable element 34 to provide the required DC voltage to the electronic choke 32, which in turn lights up the glass discharge tube 2. The charger 33 then stops charging the rechargeable element 34. The rechargeable element 34 continues to provide the required operation voltage to each needed element in the electronic unit, such as the controller 35, the oscillator unit 37 etc.

According to a preferred embodiment of the invention, the control unit 23 constantly scans the electricity network to detect whether the electricity network supplies the required AC power for the normal operation of the illumination unit 1 (FIG. 1), only when switch 21 is closed. The control unit 23 automatically detects whether switch 21 is open (nonconductive) or closed (conductive). Switch 21 is open whenever it electrically disconnects the required contact (or contacts) of the illumination unit 1 from the electricity network (i.e., switch 21 is in its nonconductive state). The scanning of the electricity network and the detection of whether switch 21 is open or closed is done in the following way:

The control unit 23 constantly scans the electricity network when switch 21 is closed by transmitting specific signals to the electricity network and then analyzing the received signals from the electricity network that correspond to those specific signals. After analyzing the received signals, the controller 35 decides whether the electricity network has supplied the required AC power to the illumination unit 1 (FIG. 1) or whether it has failed to supply it. Preferably, but not limitatively, the controller 35 is a microcontroller, such as PIC16C505 of Microchip technologies Inc.

Figures 3A, 3B:
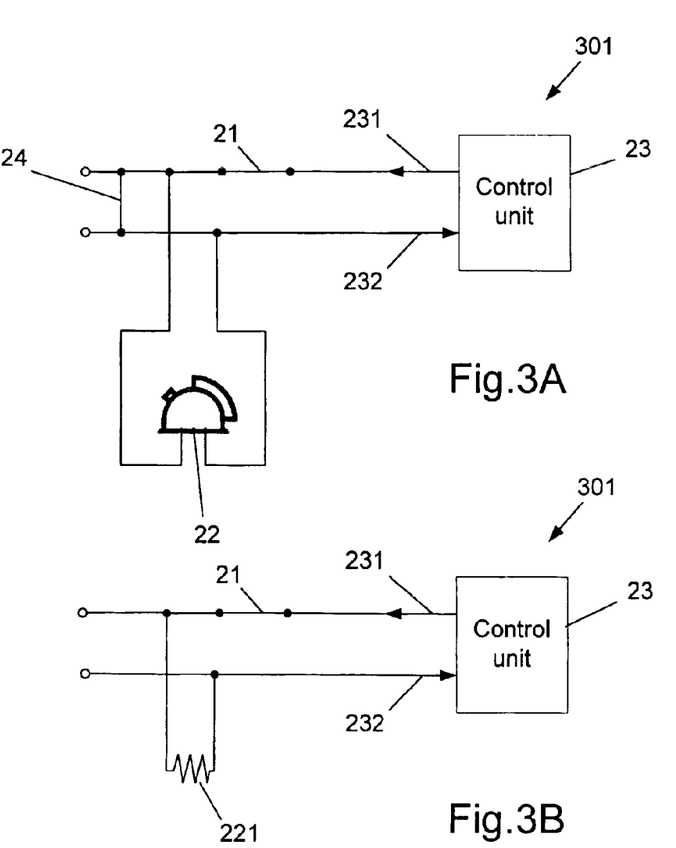
FIGS. 3A and 3B schematically illustrate the impedance variations used for automatic detection of failure of the electrical network to provide AC power, according to a preferred embodiment of the invention.

According to the preferred embodiment of the invention, the analysis performed by the controller 35 is based on the following attributes:

If the AC power is supplied and switch 21 is closed, then from the electrical point of view the AC power source is seen on the electricity network circuit as a virtual short, as shown by item 24 on the electricity network circuit 301 of FIG. 3A. Therefore, the transmitted signals from the control unit 23 are received back at the control unit 23 with essentially no delay. In this case, the controller 35 recognizes that the AC power is supplied as required, and the illumination unit 1 (FIG. 1) continues to operate normally using the AC power from the electricity network.

If the AC power source fails to supply the required AC power and switch 21 is closed, then from the electrical point of view any electrical appliance that is connected to the electricity network circuit 301 is seen as a load (i.e., a resistor), for example as shown by the load 221 that represent the electric kettle 22 on the electricity network circuit 301 in FIGS. 3A and 3B. Therefore, the signals transmitted from the control unit 23 are received back at the control unit 23 with a change (e.g., phase difference) that corresponds to the load 221. In this case, the controller 35 recognizes that the AC power source has failed to supply the required AC power and the controller 35 causes the rechargeable element 34 to start supplying electric power to light the glass discharge tube 2. The operation of scanning and checking the signals continues.

The control unit 23 constantly samples the resistance of the electricity network lines in order to detect the state of switch 21, i.e. whether it is in its conductive state or in its nonconductive state. Whenever switch 21 is in its nonconductive state, the resistance on the electricity network lines is equal to infinity, and correspondingly the input 236 to the controller 35 is set to a predetermined logic level (e.g., "0") by the sample unit 40 and will remain in that logic level until the state of switch 21 changes to conductive. In that state, the controller 35 detects that switch 21 is open and disconnects the glass discharge tube 2 from the rechargeable element 33 (if it was the source that supplied the required electric power to the glass discharge tube 2). In addition, there is no need to perform a scan to the electricity network. Whenever switch 21 is in its conductive state, the resistance on the electricity network lines is less than infinity, and accordingly the input signal 236 to the controller 35 will be changed (e.g., from "0" to "1") by the sample unit 40 and will remain in that logic level until the state of switch 21 is changed to nonconductive again. In that state the controller 35 detects that the switch 21 is closed, and in turn it activates the glass discharge tube 2. Sample unit 40 measures the impedance of the electricity network lines, and according to the description hereinabove provides at least a single bit, such as input signal 236.

According to a preferred embodiment of the invention, scanning and detection are performed in the following way:

The oscillator 37 constantly produces a series of signals, which are transmitted over a wire of the electricity network (e.g., signal 231 in circuit 301 of FIG. 3A). Preferably, this series comprises several sub-series. Each sub-series consists of a series of pulses in a specific frequency (i.e., pulse-trains). The pulse frequency in each sub-series is different. Preferably, but not limitatively, the frequencies of the sub-series have values between 1 to 100 KHz, wherein the first produced sub-series of pulses start with frequency of 1 KHz and each additional produced sub-series is produced with a higher frequency than the previous sub-series, until the last produced sub-series is produced with frequency of 100 KHz. The frequency of each sub-series is controlled by the controller 35, which also causes the start of a new series of signals whenever the previous sub-series are produced with the highest frequency (e.g., 100 KHz). For example, changing the frequency can be done by controlling an electronic digital rheostat, which influences the frequency that the oscillator 37 produces. According to another embodiment of the invention, the series of signals is produced with a constant frequency, such as 100 KHz. In that case, only a single series of signals (e.g., signals in form pulses) will be produced, with constant frequency.

According to a preferred embodiment of the invention, signal 231 is transmitted by the circuitry 301 over a wire of the electrical network (FIG. 3A) and the corresponding received signal 232 returns to the oscillator unit 37 through the other wire, on which the oscillator 37 performs phase detection with respect to signal 231. The resulting signal 233 is forwarded to the controller 35, which performs a comparison between signal 233 and signal 231. For example, the oscillator unit 37 can comprise Tone Decoder LM567 of National Semiconductor Corporation together with the required set of additional element, such as resistors and capacitor, in order to produce the signals for the comparisons, such as signals 231 and 233. Preferably, the comparison is based on the differences in the frequency and the phase of those signals. For example, the decision of the controller 35 whether to operate the fluorescent illumination unit, according to the comparison results, is determined according to the following rules:

If the frequency of signal 233 is higher than the frequency of the sent signal 231, then the controller 35 determines that the AC power is supplied. In that case, there is no delay in receiving signal 232 due to the virtual short introduced by the AC power source.

If the frequency of both signals 231 and 233 is the same, but their phase is not equal, then the controller 35 determines that the AC power source has failed to supply power. In that case, there was a delay until signal 231 was received, due to the load of the electrical apparatus that are connected to the circuit 301 (FIGS. 3A and 3B), such as the electric kettle 22, a refrigerator, a television etc.

Of course, other suitable comparison and/or rules between the transmitted signal 231 and the received signal 232 (or a signal that corresponds to a suitable manipulation on the received signal 232) might be performed, in order to allow the controller 35 to decide whether the AC power is supplied or failed, whenever switch 21 is in its conductive state. For example, comparing the amplitude of both signals and making a decision according to parameters that relates to the differences between the amplitude of those signals.

According to a preferred embodiment of the invention, each sub-series has a different frequency, preferably between 1 to 100 KHz, in order to reach relatively distant electrical appliances, as well as to respond to variant electrical appliances that may not respond to some frequencies.

According to a preferred embodiment of the invention, whenever the controller 35 decides that the AC power has failed, it allows the rechargeable element 34 (i.e., DC source) to activate the glass discharge tube 2, by providing a signal 38 that closes switch 39 and connects the rechargeable element 34 to the starter 32. The starter 32 turns on the glass discharge tube 2.

Figure 4:
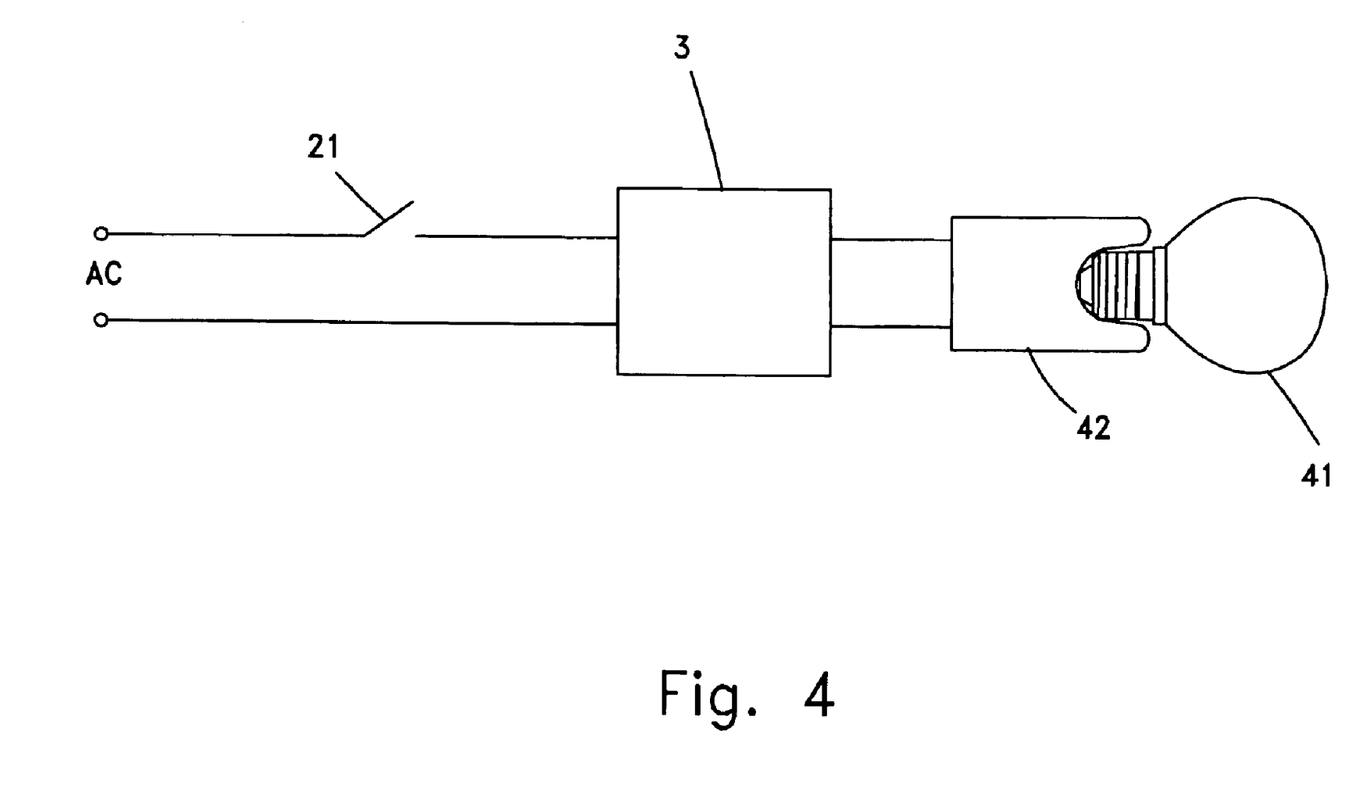
FIG. 4 schematically illustrates the implementation of base 3 of FIG. 1 as an independent unit, according to a preferred embodiment of the invention.

According to another preferred embodiment of the invention, the base 3 is provided as an independent unit that connects a housing 42 for a suitable illumination source 41, such as CFL, bulb etc., to the electrical network, as shown in FIG. 4. According to another preferred embodiment of the invention, base 3 is integrated with housing 42.

Figure 5:
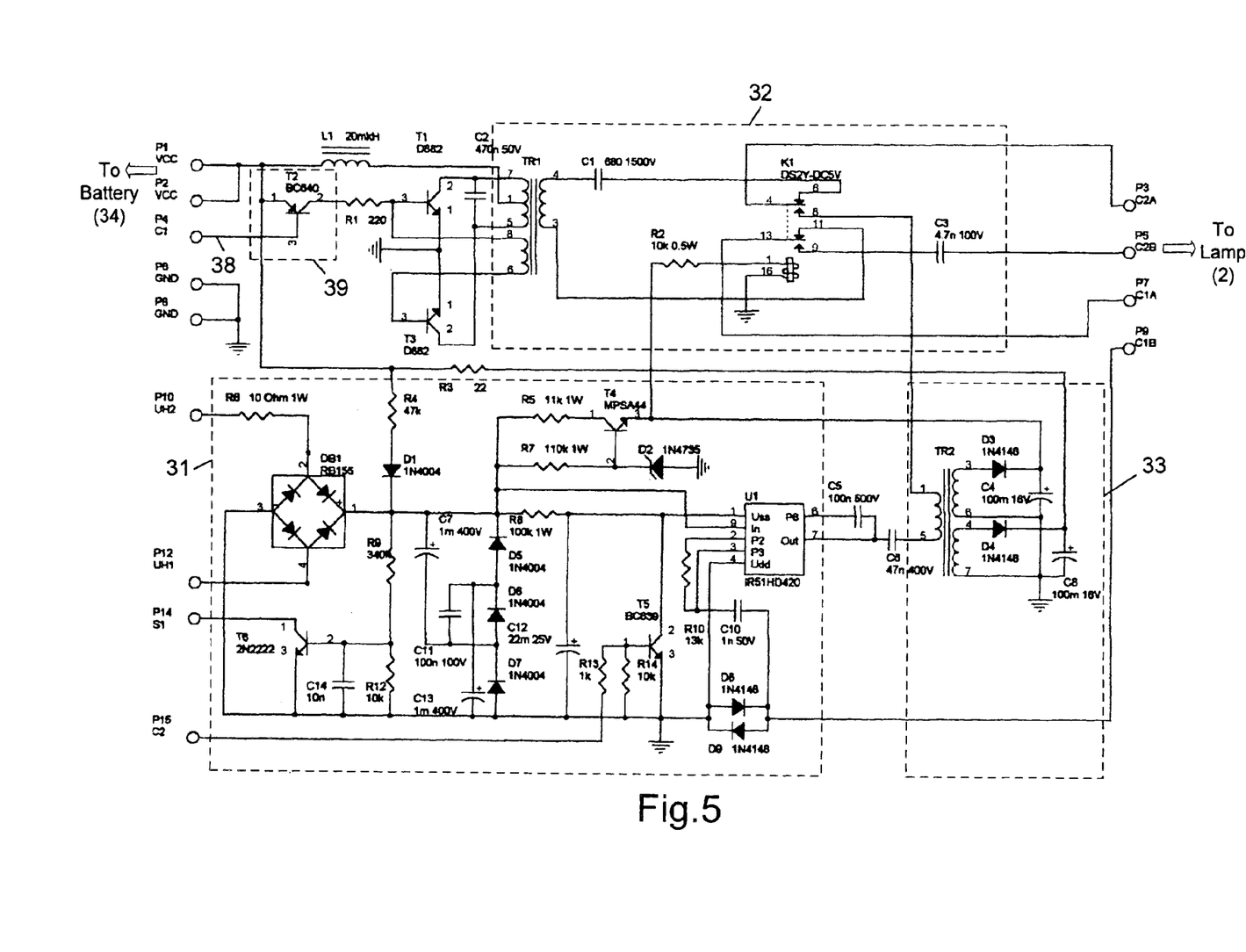
FIGS. 5 and 6 show the electrical circuit of the electronic circuit of FIG. 2, according to a preferred embodiment of the invention.
Figure 6:
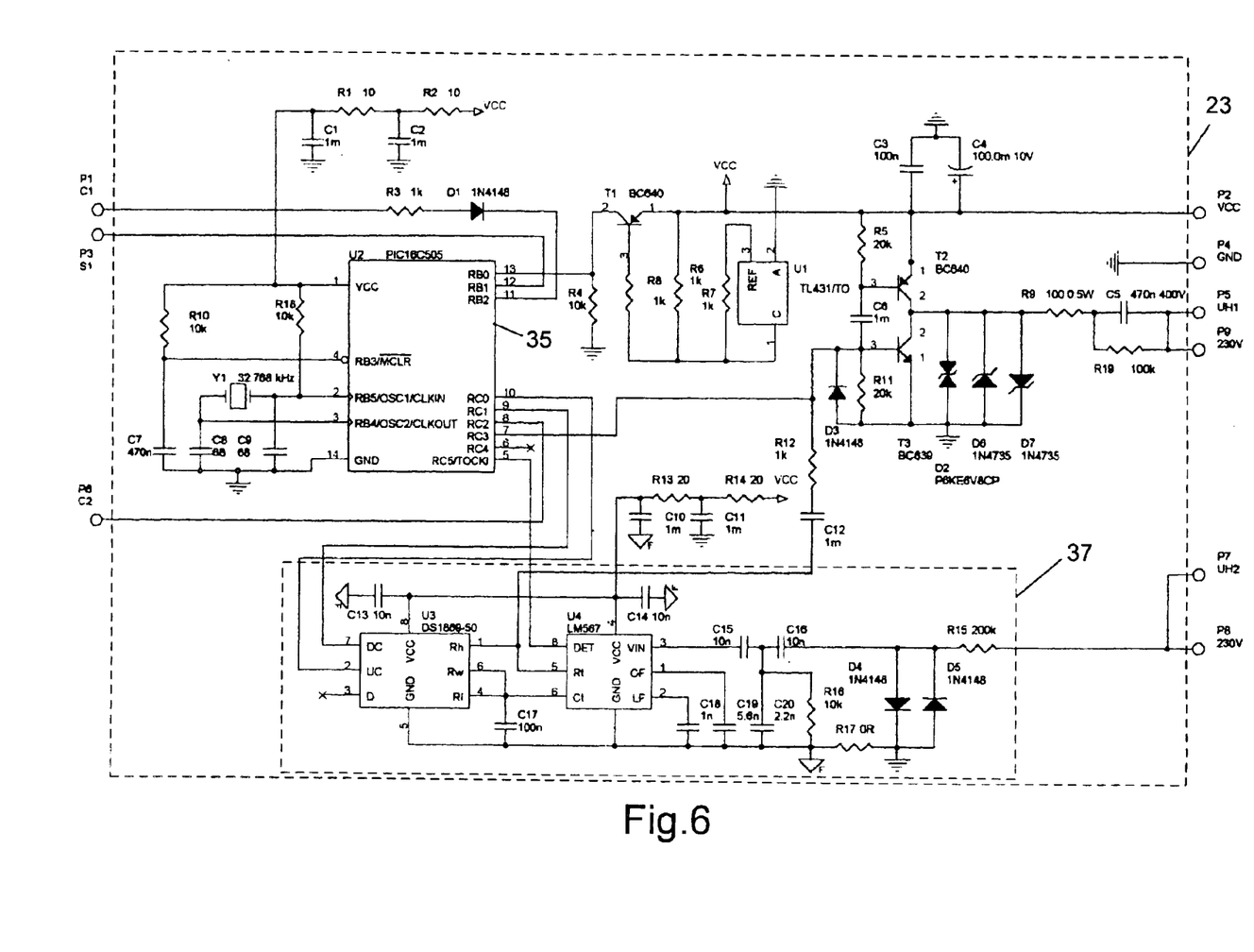

FIGS. 5 and 6 show an implementation of the electronics circuit of the base 3, according to a preferred embodiment of the invention. FIG. 5 shows the part of the electronic circuit of base 3, which comprises the converter 31, charger 33, starter 32, rechargeable element 34, controllable switch 39 and the glass discharge tube 2. FIG. 6 shows the controller 23 part of the electronic circuit of base 3, which comprises the controller 35 and the oscillator 37.

Although embodiments of the invention have been described by way of illustration, it will be understood that the invention may be carried out with many variations, modifications, and adaptations, without departing from its spirit or exceeding the scope of the claims.

What is claimed is:

1. An illumination unit, comprising:

a) a lamp;

b) contacts for connecting the unit to a main electricity network via an external switch that in turn connects or disconnects a feeding of electricity to at least one of the contacts, wherein the switch, being located somewhere along electricity feeding lines, is located externally of a casing of the illumination unit and is generally remote from the illumination unit;

c) a rechargeable element power supply for supplying electrical power to said lamp whenever said switch is in its conductive state and said electricity network fails to supply electricity; and d) an electronic circuit for automatically detecting a state of said switch and failure of said electricity network, said electronic circuit being operative to:
   d.1) connect said lamp to said rechargeable element power supply only when failure is detected in said electricity network and said external switch is found to be in its conductive state; and
   d.2) disconnect said lamp from said rechargeable element power supply if said external switch is found to be in its nonconductive state.

2. An illumination unit according to claim 1, in which the electronic circuit comprises:
   a) a converter unit for converting electrical power from the electricity network from electrical power in AC form into electrical power in DC form, said converter unit having one or more outputs that provide different levels of electrical power in DC form;
   b) an electronic choke operating as a starter and ballast for the operation of the lamp of said unit, said electronic choke being driven by at least one output of said converter;
   c) a controllable switch for connecting or disconnecting the supply of the electrical power from the rechargeable element power supply to said electronic choke to serve as a starter and ballast to said lamp, said controllable switch connecting the rechargeable element power supply whenever said external switch is found to be in its conductive state and failure of the main electricity network is detected;
   d) a control unit for performing the automatic detection of the state of the external switch and failure of said main electricity network; and
   e) a charger for charging said rechargeable element power supply with electrical power that said charger receives from said converter.

3. An illumination unit according to claim 2, in which the control unit further comprises:
   a) an oscillator unit for producing signals and for sending the produced signals on one or more of the electricity feeding lines and also for providing each sent signal to a controller; and
   b) a controller for receiving indication of each sent signal and a corresponding signal as returned from said one or more of the electricity feeding lines, said controller, by comparing between said corresponding signals, determines the way of operating the lamp, whether in a normal mode of operation, in an emergency mode of lighting, or not operating said lamp during an electricity failure period if it is determined that the external switch is in its nonconductive state, wherein said control unit operates during the emergency period by a voltage supplied from the rechargeable element power supply.

4. An illumination unit according to claim 3, in which the produced signals are pulse-trains.

5. An illumination unit according to claim 4, in which the pulse-trains have constant frequency.

6. An illumination unit according to claim 3, in which the produced signals consists of sub-series of signals in the form of pulses, each sub-series produced with different frequency.

7. An illumination unit according to claim 5 or 6, in which the frequency is determined by selecting different values of elements in circuitry of the oscillator.

8. An illumination unit according to claim 7, in which the elements are at least one capacitor and/or at least one resistor.

9. An illumination unit according to claim 5 or 6, in which the frequency is in the range of 1 to 100 KHz.

10. An illumination unit according to claim 2, in which the rechargeable element power supply is one or more rechargeable batteries and/or one or more capacitors.

11. An illumination unit according to claim 1, in which the lamp is selected from the group consisting of a fluorescent lamp, an incandescent lamp and a CFL.

12. An illumination unit according to claim 1, further comprising an adaptor for attaching the contacts of said unit to contacts of a lamp socket, wherein said lamp socket is connected to the main electricity network via the external switch.

13. An illumination unit according to claim 12, in which the lamp socket is a standard Edison-type lamp socket and the adaptor can be screwed into the lamp socket.

14. A method for operating an illumination unit that comprises a lamp, a rechargeable element for providing, when desired, power to the lamp during times when a main electricity supply fails, comprising the steps of:
   a) operating the lamp of the illumination unit from the main electricity supply in a normal manner by turning it ON or OFF by means of a switch being located externally of a casing of the illumination unit, said switch being generally remote from said casing; and
   b) continuously checking a state of said external switch and a state of the main electricity supply, and turning ON the lamp by supplying power to it from the rechargeable element only when it is determined that the main electricity supply fails and that the state of said external switch is ON.

15. The method according to claim 14, wherein the determination whether the external switch is ON or OFF is made by means of sending one or more signals toward an electricity line on which the external switch is located, receiving returned signals from the line, and analyzing the returned signal in comparison with the sent signal.

16. The method according to claim 15, wherein the sent signals are in the form of pulses.

17. The method according to claim 16, wherein the pulses have a constant frequency.

18. The method according to claim 15, wherein the sent signals consist of sub-series of signals in the form of pulses, each sub-series having a different frequency.

19. The method according to claim 17 or 18, wherein the frequency is in the range of 1 to 100 KHz.

20. The method according to claim 14, wherein the rechargeable elements are one or more rechargeable batteries and/or one or more capacitors.

21. The method according to claim 14, wherein the lamp is selected from the group consisting of a fluorescent lamp, an incandescent lamp and a CFL.

* * * * *